(12) United States Patent
Briscoe

(10) Patent No.: US 6,749,829 B2
(45) Date of Patent: Jun. 15, 2004

(54) HYDROGEN TO STEAM REFORMING OF NATURAL GAS TO SYNTHESIS GAS

(75) Inventor: Michael D. Briscoe, Katy, TX (US)

(73) Assignee: BP Corporation North America Inc., Warrenville, IL (US)

( * ) Notice: Subject to any disclaimer, the term of this patent is extended or adjusted under 35 U.S.C. 154(b) by 0 days.

(21) Appl. No.: 10/201,339

(22) Filed: Jul. 23, 2002

(65) Prior Publication Data

US 2004/0018144 A1 Jan. 29, 2004

(51) Int. Cl.$^7$ .............................................. C01B 3/00
(52) U.S. Cl. ...................... 423/651; 252/373; 423/580.1
(58) Field of Search ....................... 252/373; 48/197 R; 423/580.1, 651, 652, 653

(56) References Cited

U.S. PATENT DOCUMENTS

| | | | |
|---|---|---|---|
| 4,240,805 A | 12/1980 | Sederquist | 48/214 |
| 4,293,315 A | * 10/1981 | Sederquist | 48/94 |
| 4,642,272 A | 2/1987 | Sederquist | 429/17 |
| 4,816,353 A | 3/1989 | Wertheim et al. | 429/19 |
| 5,741,474 A | 4/1998 | Isomura et al. | 423/648.1 |
| 6,280,864 B1 | 8/2001 | Towler et al. | 429/17 |
| 6,299,984 B1 | 10/2001 | Forloni | 428/474.4 |

FOREIGN PATENT DOCUMENTS

DE  4005468  8/1991

OTHER PUBLICATIONS

Pruitt, "Mineral Terms—Some Problems in Their Use and Definition", 11 Rocky Mt. Min. L. Inst. 1, 16 (1966).

* cited by examiner

Primary Examiner—Stanley S. Silverman
Assistant Examiner—Maribel Medina
(74) Attorney, Agent, or Firm—Thomas A. Yassen; John L. Wood

(57) ABSTRACT

The present invention is directed to a process for producing synthesis gas comprising the steps of reacting a hydrogen-containing stream with an oxygen-containing stream and producing an oxidized stream comprising water; contacting a feedstream comprising hydrocarbon or hydrocarbon comprising at least one atom of oxygen with the oxidized stream comprising water and forming a reforming feedstream; and passing the reforming feedstream into a reforming reaction zone at reforming reaction conditions and producing a synthesis gas product.

20 Claims, 1 Drawing Sheet

HYDROGEN TO STEAM REFORMING OF NATURAL GAS TO SYNTHESIS GAS

BACKGROUND OF THE INVENTION

This invention relates to a process for cost-effectively producing commercial products from natural gas. More particularly, this invention relates to an improved process for manufacturing synthesis gas, an intermediate product useful for subsequent conversion to more easily stored and transported hydrocarbon products.

Natural gas generally refers to rarefied or gaseous hydrocarbons found in the earth. Non-combustible natural gases occurring in the earth, such as carbon dioxide,-helium and nitrogen are generally referred to by their proper chemical names. Often, however, non-combustible gases are found in combination with combustible gases and the mixture is referred to generally as "natural gas" without any attempt to distinguish between combustible and non-combustible gases. See Pruitt, "Mineral Terms-Some Problems in Their Use and Definition," Rocky Mt. Minn. L. Rev. 1, 16 (1966).

Natural gas is often plentiful in regions where it is uneconomical to develop those reserves due to lack of a local market for the gas or the high cost of processing and transporting the gas to distant markets.

The technologies currently employed to move natural gas to remote markets generally include, but are not limited to, pipelines, the cryogenic manufacture of liquefied natural gas (LNG), and the production of Gas to Liquids (GTL) products. Each of these technologies feature benefits and incur penalties which can make one technology preferred over another for any given commercial environment.

Traditional GTL products include, but are not limited to, methanol, acetic acid, olefins, dimethyl ether, dimethoxy methane, polydimethoxy methane, urea, ammonia, fertilizer and Fischer Tropsch (FT) reaction products. The FT reaction produces mostly hydrocarbon products of varying carbon chain length, useful for producing lower boiling alkanes, alkenes, naphtha, distillates useful as jet and diesel fuel and furnace oil, and lubricating oil and wax base stocks.

GTL products, such as those produced from FT synthesis, including FT diesel fuels, have chemical and physical properties and environmental qualities that permit these products to most easily benefit from traditional energy infrastructure, including fuel storage and dispensing equipment. Additionally, fuel consuming equipment such as automotive/airplane engines as well as other utility, transportation and domestic power systems are currently more receptive or adaptable to the use of GTL products.

The broader implementation of GTL technology commercially, however, has been limited by the high capital cost and operational efficiency of the GTL manufacturing plants. Moreover, the largest single component of capital cost and the single largest contributor to operational efficiency (or inefficiency) has generally been the synthesis gas manufacturing units at the GTL manufacturing plant.

Therefore, there is a great need in industry for improved synthesis gas technology that is cost effective and operationally efficient.

For purposes of the present invention, methods for producing GTL products are categorized as either indirect synthesis gas routes or as direct routes. The indirect synthesis gas routes involve the production of synthesis gas comprising hydrogen and carbon monoxide as an intermediate product whereas the direct routes shall be construed as covering all others.

The most common commercial methods for producing synthesis gas are steam/methane reforming, auto-thermal reforming, gas heated reforming, partial oxidation, and combinations thereof.

Steam/methane reforming reacts steam and natural gas at high temperatures and moderate pressures over a reduced nickel-containing catalyst to produce synthesis gas where the reaction heat is applied externally to the process.

Autothermal reforming processes steam, natural gas and oxygen through a specialized burner where only a portion of the methane from the natural gas is combusted. Partial combustion of the natural gas provides the heat necessary to conduct the reforming reactions that will occur over a catalyst bed located in proximity to the burner.

Gas heated reforming consists of two reactors, a gas heated reformer reactor and an autothermal reformer reactor. Steam and natural gas are fed to the gas-heated reformer where a portion of the natural gas reacts, over catalyst, to form synthesis gas. This mixture of unreacted natural gas and synthesis gas is then fed to the autothermal reformer, along with oxygen, where the remaining natural gas is converted to synthesis gas. The hot synthesis gas stream exiting the autothermal reformer is then routed back to the gas reformer to provide the heat of reaction necessary for the gas-heated reformer.

Partial oxidation generally processes steam, natural gas and oxygen through a specialized burner where a substantial portion of the methane is combusted at high temperatures to produce synthesis gas. Contrary to autothermal reforming, no catalyst is present in the partial oxidation reactor.

Autothermal reforming, gas heated reforming, and partial oxidation all require an internal natural gas oxidation step where hydrocarbon is partially oxidized, generally in the presence of less than 60 mole % of the stoichiometric amount of oxygen necessary to fully oxidize natural gas to carbon dioxide and water. In each case, the hydrocarbon oxidation step results in a measurable portion of the hydrocarbon being converted into carbon dioxide. Carbon dioxide formation reduces the overall thermal efficiency of the GTL process resulting in lower product yields. The natural gas oxidation step, at high temperatures, can also lead to the formation of coke, soot, and coke and soot precursors that deactivate the synthesis gas catalyst, increase reactor pressure drop, and/or cause the synthesis gas reactors to plug.

Steam/methane reforming converts natural gas to synthesis gas in the presence of steam at elevated temperatures without the use of oxygen but with other means of external heat input. Since the steam/methane reforming reaction itself does not include internal oxidation or partial oxidation, substantially all of the energy required to facilitate the reaction must be supplied from an external source. These external sources generally include high reactor feed preheat temperatures supplemented by heat input supplied externally by the complete combustion of natural gas. In each case, the combustion products from the external heat supplied (water and carbon dioxide) are released to the atmosphere and are not converted to synthesis gas.

The steam/methane reforming reaction can also result in the formation of a synthesis gas having a higher hydrogen to carbon monoxide ratio than is desirable for certain GTL commercial uses. Such steam reforming processes often necessitate installation of equipment to remove excessive hydrogen prior to any downstream conversion steps or, after downstream conversion steps, result in unconverted hydrogen, carbon dioxide, light hydrocarbon and unrecovered synthesis gas being recycled within the process or consumed as fuel.

It has now been found that hydro-steam reforming utilizing steam recovered from the oxidation of hydrogen to water increases synthesis gas reforming process efficiency compared to steam/methane reforming processes requiring external energy sources that ultimately exhaust higher levels of carbon in the form of carbon dioxide to the atmosphere.

It has also been found that hydro-steam reforming utilizing the energy recovered from the oxidation of hydrogen to water substantially reduces or eliminates any external energy inputs that would otherwise be required to reach steam/methane reforming reaction temperatures or to sustain an endothermic steam/methane reforming process.

It has also been found that utilizing energy recovered from the oxidation of hydrogen substantially reduces coke and particulate accumulation in the reforming reaction zone compared to processes that oxidize substantial portions of natural gas hydrocarbon for reaction energy.

It has also been found that where hydro-steam reforming utilizing steam recovered from the oxidation of hydrogen results in a synthesis gas having a higher than stoichiometrically optimum molar ratio of hydrogen to carbon monoxide, that the excess hydrogen can be separated and synergistically oxidized to steam for further conversion to synthesis gas.

SUMMARY OF THE INVENTION

Therefore, the present invention is directed to a process for producing synthesis gas comprising the steps of reacting a hydrogen-containing stream with an oxygen-containing stream and producing an oxidized stream comprising water; contacting a feedstream comprising hydrocarbon or hydrocarbon comprising at least one atom of oxygen with the oxidized stream comprising water and forming a reforming feedstream; and passing the reforming feedstream into a reforming reaction zone at reforming reaction conditions and producing a synthesis gas product.

In another embodiment, the present invention is directed to a process for producing synthesis gas comprising the steps of oxidizing at least a portion of a hydrogen-containing stream with an oxygen-containing stream in an amount ranging from about 80 mole % to about 105 mole % of the stoichiometrically required amount of oxygen required to fully oxidize the hydrogen-containing stream to water, carbon dioxide or both and producing an oxidized stream comprising water at elevated temperatures; contacting a feedstock comprising hydrocarbon or hydrocarbon comprising at least one atom of oxygen with the oxidized stream comprising water and forming a reforming feedstream; and passing the reforming feedstream into a steam reforming reaction zone at steam reforming reaction conditions and producing a synthesis gas product.

In still another embodiment, the present invention is directed to a process for producing synthesis gas comprising the steps of oxidizing at least a portion of a hydrogen-containing stream with a stream comprising oxygen such that more than 60 mole % of the hydrogen-containing stream is oxidized to water, carbon dioxide or both in the reacting step and producing an oxidized stream comprising water at elevated temperature; contacting a hydrocarbon feedstream with the oxidized stream comprising water and forming a reforming feedstream; and passing the reforming feedstream into a steam reforming reaction zone at steam reforming reaction conditions and producing a synthesis gas product, wherein a substantial portion of the steam reforming heat of reaction is provided from the oxidizing step.

The hydro-steam reforming process in accordance with the present invention benefits from the oxidation of hydrogen to steam for supplying the energy necessary to initiate and sustain the endothermic steam methane reforming heat of reaction. The oxidation products of hydrogen (stream/water) are substantially friendlier to the environment than steam reforming processes which oxidize hydrocarbon to greenhouse gases such as carbon dioxide. Moreover, the oxidation products of the hydrogen-containing stream are consumed toward the production of synthesis gas compared to prior art steam reforming processes which generally exhaust hydrocarbon combustion products (carbon dioxide and water) to the atmosphere.

The hydro-steam reforming process in accordance with the present invention results in substantially improved operational reliability. The process of the present invention oxidizes clean burning hydrogen to provide the energy necessary to initiate and sustain the hydro-steam reforming reaction. Partial Oxidation, autothermal, and gas heated reforming processes oxidize hydrocarbon to sustain their synthesis gas conversion reactions resulting in the formation of coke, soot, and coke and soot precursors which contribute to catalyst deactivation, catalyst bed pressure drop/plugging, and reduced plant operability.

The hydro-steam reforming process in accordance with the present invention can be operated in a manner so as to manufacture its own hydrogen fuel requirements. The hydro-steam reforming process manufactures synthesis gas at a higher molar ratio of hydrogen to carbon monoxide than the stoichiometrically optimum ratio required for many of the known downstream GTL processes. In this manner, hydrogen separation steps may be incorporated to remove any excess hydrogen which may then be directed for the hydro-steam reforming reaction thereby producing a synthesis gas product having the optimum synthesis gas molar ratio of hydrogen to carbon monoxide for the particular downstream GTL process while minimizing or eliminating any need for externally supplied hydrogen.

The hydro-steam reforming process in accordance with the present invention requires substantially less steam/water addition than steam methane reforming and can be operated in a manner so as to be either a net consumer (or net producer) of water/steam. Since many downstream GTL operations, such as, but not limited to, Fischer Tropsch, methanol and DME manufacture generally operate as net exporters of waste water/steam, this water consumption capability synergistically and beneficially reduces raw water purification costs and the costs associated with waste water chemical addition.

The hydro-steam reforming process in accordance with the present invention can be designed in such a manner so as to eliminate the need for an external fired furnace. Through the optional use of supplemental steam and hydrogen addition, the hydro-steam process can generate sufficient hydrogen to entirely initiate and sustain the endothermic steam reforming reaction while providing sufficient hydro-steam reforming reactor preheat to eliminate the fired furnaces generally required to operate steam/methane reformers.

DESCRIPTION OF THE PREFERRED EMBODIMENT(S)

Figure 1:
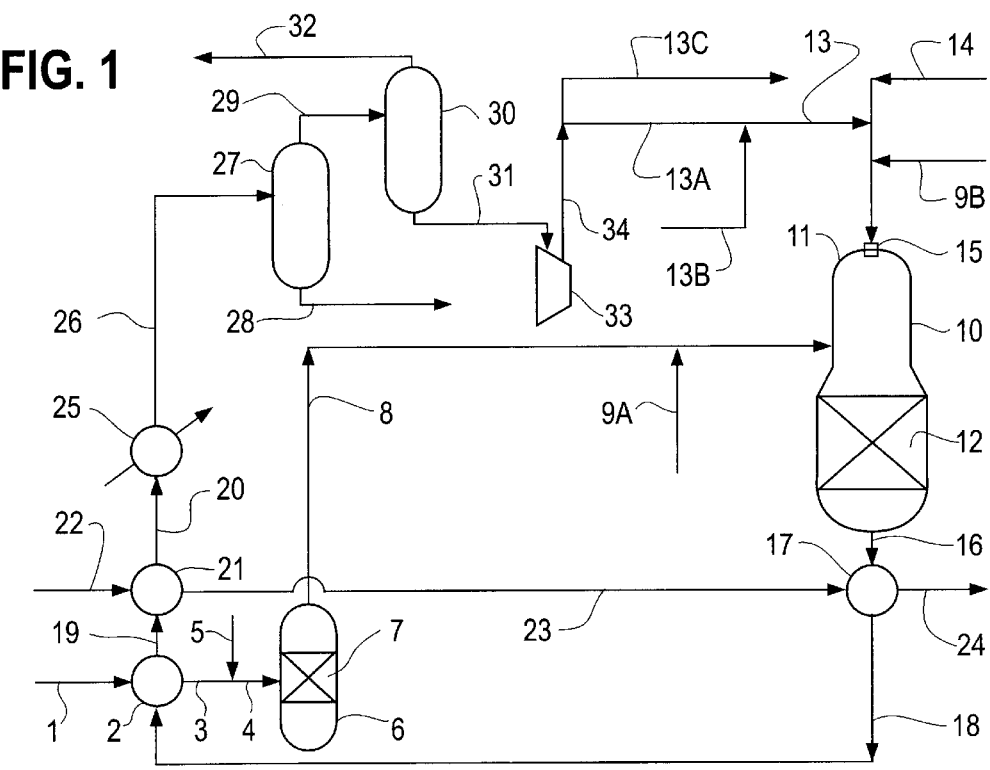
FIG. 1 is directed to a hydro-steam reforming process for producing synthesis gas in accordance with the present invention.

The present invention is directed to a process for producing synthesis gas from natural gas as that term is defined above. The natural gas contemplated herein generally comprises at least 50 mole percent methane, preferably at least 75 mole percent methane, and more preferably at least 90 mole percent methane for best results. The balance of natural gas generally comprises other combustible hydrocarbon such as, but not limited to, lesser amounts of ethane, propane, butane, pentane, and heavier hydrocarbons and sometimes other components such as carbon dioxide, hydrogen sulfide, helium and nitrogen.

The natural gas stream may be supplemented by the addition of hydrocarbons comprising one or more atoms of oxygen such as may be found in GTL intermediate and product streams. Examples of such hydrocarbons may include, but are not limited to, alcohols such as methanol and ethers such as dimethyl ether.

The presence of heavier hydrocarbons such as ethane, propane, butane, pentane, and hydrocarbons boiling at temperatures above the boiling temperature of pentane are generally reduced in the natural gas through upstream gas processing (gas-liquid separation) steps. Hydrocarbons boiling at temperatures above the boiling point of pentane or hexane are generally directed to crude oil or condensate. Hydrocarbons boiling substantially at a temperature above the boiling point of ethane and below the boiling point of pentane or hexane are generally removed and considered to be natural gas liquids or "NGLs" for purposes of the present invention.

The natural gas processed in accordance with the processing steps of the present invention is preferably of a composition such that it may be directed for the manufacture of synthesis gas without requiring additional processing steps for removal of NGLs.

For most markets, it is also desirable to reduce or, in some cases, minimize the presence of non-combustibles such as carbon dioxide, helium and nitrogen and contaminants such as hydrogen sulfide or mercaptan. Depending on the quality of a given natural gas reservoir (which may contain as much as 50% to 70% carbon dioxide), the natural gas may be pre-processed at a natural gas plant for pre-removal of such of the above components or may be conveyed directly to the plant for pre-processing prior to manufacture of synthesis gas. The feedstock suitable for use with the process of the present invention generally contains less than 5 mole percent of carbon dioxide, more preferably less than 2 mole percent, and more preferably less than 1 mole percent for best results.

Notwithstanding the foregoing, the process of the present invention is uniquely configured so as to tolerate high concentrations of carbon dioxide in the natural gas feed. While most GTL processes generally feature carbon dioxide removal steps, the hydro-steam reforming process of the present invention can process more than 10 mole percent carbon dioxide in the natural gas feed, as much as 15 mole percent carbon dioxide, and, from time to time, as much as 20 or more mole percent carbon dioxide in the feedstock.

Natural gas is generally made available or transported at pressures as high as 2800 psig, more commonly at pressures ranging from 100 psig to 1400 psig, and most commonly at pressures ranging from 400 psig to 1200 psig. The temperature of the natural gas is dependent on its originating source. Where the natural gas is pipeline gas, its temperature can approximate ambient conditions such as for example, 0° F. to 120° F. If the natural gas conditions are measured in proximity to a conveyance device such as a natural gas compressor, outlet and post-compression equipment may dictate or affect the temperature and pressure of the natural gas feed.

Pretreatment steps suitable for use with the present invention generally begin with steps commonly identified with synthesis gas production, including, but not limited to, removal of acid gases (i.e., $CO_2$, $H_2S$, etc.), mercaptan, and volatile metals such as mercury and occasionally moisture from the natural gas stream. Acid gases are commonly removed via a sorption process employing an aqueous amine-containing solution or other types of physical or chemical solvents. Mercaptans are commonly eliminated through processes for chemically converting these mercaptans to sulfides utilizing technologies generally known in the art. Mercury is generally removed through use of mercury sorbent beds.

Figure 2:
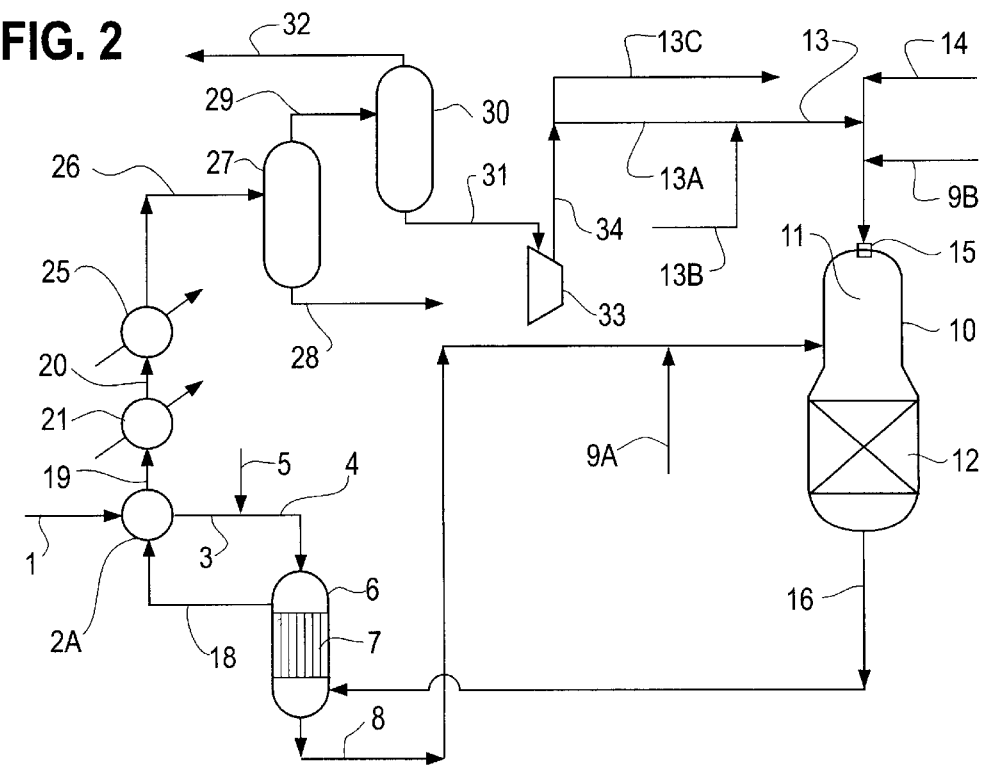
FIG. 2 is directed to a hydro-steam reforming process integrated with a higher temperature gas heated reforming step for producing synthesis gas in accordance with the present invention.

FIGS. 1 and 2 illustrate processes for producing synthesis gas incorporating elements of the present invention.

In FIGS. 1 and 2, a portion of a pretreated natural gas feedstock 1 is directed to preheat exchanger 2 or 2A, as the case may be, for preheating the pretreated natural gas feedstock to pre-reforming or higher temperature reforming conditions as the case may be. The heat source stream 18 for preheat exchanger 2 is generally provided from feed/effluent heat transfer with the hot effluent being made available from downstream processing steps. The heat source stream for preheat exchanger 2A is the cooled synthesis gas effluent 18 from the higher temperature reformer 6. However, saturated or superheated steam may also be used for preheat for either the FIG. 1 or FIG. 2 configuration.

The preheat exchanger outlet stream 3 may be combined with a minor amount of steam from stream 5 thereby forming pre-reforming or higher temperature reforming feedstock 4 for directing to pre-reforming (FIG. 1) or higher temperature reforming reactor 6 (FIG. 2) comprising pre-reforming or higher temperature reforming catalyst 7.

The pre-reforming reaction contemplated in FIG. 1 is conducted largely for the purpose of improving the natural gas feedstock quality by converting ethane and higher boiling point hydrocarbon by passing feedstock 4 over a pre-reforming catalyst 7 suitable for converting ethane and higher boiling point hydrocarbon into synthesis gas and methane. The pre-reforming reaction is conducted substantially adiabatically at reaction temperatures generally ranging from about 500° F. to about 1000° F. and more preferably from about 750° F. to about 1000° F. for best results. Suitable catalysts for the pre-reforming reaction generally include, but are not limited to, a high activity nickel containing-catalyst. Suitable pre-reforming catalyst deployments can include tubular reactors, flat or platformed fixed bed configurations a well as other systems known to those skilled in the art. Excessive amounts of higher boiling point hydrocarbon passing to the synthesis gas reforming or manufacturing section can result in the formation of coke contaminants thereby causing soot formation, catalyst bed or tube pluggage, and reduced catalyst activity. Notwithstanding the foregoing, the process of the present invention is more tolerant of minor amounts of light hydrocarbon in the reformer feed than oxidative or partial oxidative processes known in the prior art.

The higher temperature gas heated reforming reaction contemplated in FIG. 2 is the preferred embodiment for the present invention. The high temperature gas heated reforming reaction is also conducted to improve the natural gas feedstock quality by converting ethane and higher boiling point hydrocarbon by passing feedstock 4 over a higher temperature reforming catalyst 7 suitable for converting ethane and higher boiling point hydrocarbon into synthesis gas and methane. Additionally, the gas heated reforming step also initiates the steam reforming reaction for conversion of natural gas feedstock into synthesis gas.

The higher temperature gas heated reformer 6 is generally integrated with the hydro-steam reaction step wherein the synthesis gas effluent 16 exiting the reactor is passed in either concurrent or counter current relationship to feedstock 4 for the purposes of heating and providing heat of reaction for the higher temperature gas heated reforming reaction. The higher temperature gas heated reforming reaction contemplated in FIG. 2 is conducted at reaction temperature profiles generally in excess of 1000° F. and generally ranging from about 1000° F. to about 1600° F., measured at the gas heated reforming reaction zone outlet. The higher temperature gas heated reforming reaction is commonly conducted within catalyst-filled tubes while the synthesis gas effluent 16 passes within the higher temperature gas heated reforming reactor 6 and outside of the catalyst-filled tubes.

Integrating the energy requirements of the higher temperature gas heated reforming reactor 6 with the reactor effluent 16 provides additional benefits over and above the configuration illustrated in FIG. 1. The heat integrated higher temperature reforming process of FIG. 2 requires lower oxygen and steam/water addition to the overall system. In addition and partly as a result of the foregoing, the process of FIG. 2 can be thermally more efficient than the pre-reforming configuration and substantially more thermally efficient than the prior art.

For FIGS. 1 and 2, pre-reformer or higher temperature gas heated reformer effluent stream 8 exits reactor 6 for directing to the hydro-steam reforming step. Optionally, the pre-reformer effluent stream 8 may be preheated by directing the stream to one or more preheat exchangers (not pictured) and/or to a fired heater or furnace (not pictured) for pre-heating the reformer feedstock 8 to hydro-steam reforming conditions. The heat source for preheat exchangers, as might be suitable for use with the present invention, would generally be provided through feed/effluent heat transfer from the products of the reforming reaction although saturated or superheated steam may also be used for preheat. A furnace or fired heater may be useful for providing supplemental energy for the reforming reaction if and to the extent that the reforming reaction cannot be entirely sustained through the hydro-steam reforming process of the present invention or for process startup purposes. In most embodiments of the present invention, a furnace will not be necessary for supplemental heat input.

The modified hydro-steam reforming process of the present invention features a reactor 10 comprising an upper steam with hydrocarbon mixing zone 11 and a lower steam reforming reaction zone 12. Reactor 10 may also be designed in an upflow configuration where the reactor 10 would comprise a lower steam with hydrocarbon mixing zone and an upper steam reforming reaction zone. Reactor 10 may also be configured horizontally as may be appropriate considering the specific requirements of a particular usage.

The pre-reformer or higher temperature gas heated reformer effluent stream 8 may be optionally supplemented with steam from steam conduit 9A prior to entering the steam with hydrocarbon mixing zone 11 of reactor 10.

A substantial portion of the steam provided for the hydro-reforming reaction of the present invention is provided by the reaction of a hydrogen-containing stream supplied from conduit 13 with an oxygen-containing stream 14 as it enters the steam with hydrocarbon mixing zone 11. The hydrogen-containing stream 13 may be produced internally from the hydro-steam reforming process of the present invention and conduit 13A or may be supplied externally from conduit 13B. Preferably, at least 30 percent (measured as a ratio by weight) of the total steam supplied for the reforming reaction is supplied from the reaction of the hydrogen-containing stream 13 with the oxygen-containing stream 14, preferably at least 50 percent, and more preferably at least 60 percent for best results.

Suitable hydrogen-containing streams generally comprise at least 50 mole percent hydrogen, preferably at least 70 mole percent hydrogen, more preferably at least 80 mole percent hydrogen, and most preferably at least 90 mole percent hydrogen for best results. The balance of the hydrogen-containing stream generally comprises light hydrocarbon such as, but not limited to methane, methanol, ethane, ethanol, propane, butane and pentane along with, from time to time, other non-hydrocarbons such as carbon monoxide and carbon dioxide. It is generally preferable to minimize the concentration of carbon atoms in the hydrogen-containing stream.

Suitable oxygen-containing streams generally comprise at least 21 mole percent oxygen, preferably at least 50 mole percent oxygen, more preferably at least 70 mole percent oxygen, and most preferably at least 90 mole percent oxygen for best results. The presence of large concentrations of non-hydrocarbon components such as nitrogen, argon, and helium in the oxygen-containing stream (or the hydrocarbon stream) is undesirable as these components must be removed from the synthesis gas or GTL products, generally at the expense of higher capital and operating expenses. Higher concentrations of inert components also result in reduced thermal efficiency and higher carbon dioxide formation.

For purposes of the present invention, the hydrogen-containing stream may be contacted with the oxygen-containing stream prior to entering the steam with hydrocarbon mixing zone 11. This mixing may be achieved through piping configurations or either the hydrogen-containing stream 13 or the oxygen-containing stream 14 may be educted into the other (as the case may be) so as to improve mixing and reduce energy requirements necessary to convey both streams to the steam with hydrocarbon mixing zone 11. Eduction may be achieved through piping configurations or through use of venturi or other related devices.

Mixing and oxidation of the hydrogen-containing stream with the oxygen-containing stream is preferably achieved through a conventional or specially modified gas burner 15 which can be designed to maximize oxidation efficiency. The burner 15 tip may protrude into the steam with hydrocarbon mixing zone 11 or may be recessed. The mixing may be optimized through use of conventional burner designs or may be enhanced through use of radial swirling motions or other mechanisms so as to maximize mixing and burning efficiency while maintaining the mechanical and metallurgical integrity of the reactor 10.

The oxidation of hydrogen to steam will result in high adiabatic flame temperatures as necessary to facilitate the hydro-steam reforming reaction. Design features may be incorporated into the process of the present invention to reduce adiabatic flame temperatures. Steam stream 9B can be added to the oxygen-containing stream 14 and hydrogen-containing stream 13 mixture so as to provide a sensible heat sink for absorbing energy liberated from the oxidation of the hydrogen-containing stream 13. Steam may also be added individually to either the oxygen-containing stream 14 or the hydrogen-containing stream 13 (not pictured). Addition of steam to the oxygen-containing stream 14 directly or through stream 13B are the preferred locations for best results.

In still another embodiment, carbon dioxide may also be added to the hydrogen-containing stream 13 or the oxygen-containing stream 14 (not pictured) to reduce adiabatic flame temperatures.

In the preferred embodiment of the present invention, the hydrogen oxidation step is performed at or near the stoichiometric levels required to oxidize the hydrogen to water/steam and to completely oxidize any hydrocarbon that may be present in the hydrogen-containing stream to carbon dioxide and water.

In another embodiment of the present invention, the hydrogen oxidation step can be performed with less than the stoichiometric amount of oxygen required to completely oxidize the hydrogen to water/steam and to completely oxidize any hydrocarbon that may be present in the hydrogen-containing stream to carbon dioxide and water. For some operations, supplying and reacting an oxygen-containing stream with a hydrogen-containing stream substoichiometically can provide synergistically superior results compared to operating above the stoichiometric amounts of molecular oxygen.

In particular, it has been found that the oxidation of hydrogen to water reaction advances more closely to completion at constant conditions of temperature and pressure than the partial oxidation reaction of hydrocarbon such as methane and ethane to carbon monoxide, carbon dioxide, hydrogen, and water. It has also been found that the reaction rate of oxidizing hydrogen to water/steam occurs substantially faster than the partial oxidation reaction of methane and ethane to carbon monoxide, carbon dioxide, hydrogen, and water.

For the foregoing reasons, oxidizing the hydrogen-containing stream with the oxygen-containing stream at or slightly below stoichiotric can synergistically and selectively consume oxygen to the oxidation of hydrogen to water versus undesirably partially oxidizing hydrocarbon to synthesis gas prematurely in the hydrocarbon mixing zone 11. In this manner, less than pure hydrogen may be utilized to effect the hydrogen to steam oxidation reaction resulting in a substantial savings in purification costs and/or permitting the injection of lower purity hydrogen or waste hydrogen streams into the hydrogen-containing stream such as through conduit 13B. Furthermore, the selectively lower levels of hydrocarbon partially oxidized to form carbon monoxide and hydrogen further reduces coke, soot, and coke and soot precursor production, thereby improving reforming reaction system reliability and run length. The presence of coke and soot particulate generally contributes to catalyst deactivation, catalyst bed pressure drop, and reduced plant operability.

Based on the foregoing, the hydro-steam process of the present invention preferably operates with from about 80 mole % to about 105 mole % of the stoichiometrically required amount of oxygen to fully oxidize the hydrogen-containing stream to water and carbon dioxide. Preferably, the hydro-stream process of the present invention operates with from about 90 mole % to about 102 mol % of the stoichiometrically required oxygen to fully oxidize the hydrogen-containing stream to water and carbon dioxide and more preferably with from about 95 mole % to about 100 mole % for best results. The volumes (and volume ratio) of the oxygen-containing and hydrogen-containing streams will vary with the precise composition of the respective streams.

For purposes of the present invention, it is preferred that sufficient volumes of the oxygen-containing stream be added to the hydrogen-containing stream to maintain operations above the minimum threshold of the substoichiometric operating ranges identified above. Operating at too low of a substoichiometric level may permit excessive hydrogen to pass into the steam with hydrogen mixing zone 11 unreacted or result in substantial partial oxidation of any hydrocarbon present in the hydrogen-containing stream thereby causing coke and soot formation. Where hydrogen break through occurs, the reforming reaction does not benefit from the exothermic heat release from the hydrogen oxidation reaction. The presence of hydrogen entering the reaction zone 12 also results in a lower steam reforming conversion of pre-reformer effluent/reformer feed stream 8 to hydrogen and carbon monoxide. In addition, excessive hydrogen breakthrough results in creation of a hydrogen recycle loop which renders the process less thermally efficient.

Referring to FIGS. 1 and 2, the steam/water along with any other partial or full oxidation products that could include carbon monoxide, carbon dioxide and the like, and/or unreacted hydrogen or hydrocarbons from the oxidation of the hydrogen-containing stream 13 with the oxygen-containing stream 14 enter or are produced in the steam with hydrocarbon mixing zone 11. Reformer feed stream 8, to the extent supplemented by steam from conduit 9A, is also added to the steam with hydrocarbon mixing zone 11 where it is mixed with the steam/water, carbon monoxide and hydrogen prior to entering the steam reforming reaction zone 12.

One purpose of the steam with hydrocarbon mixing zone 11 is to adequately mix steam with hydrocarbon to facilitate higher conversion to synthesis gas in the reaction zone 12. Another purpose of the steam with hydrocarbon mixing zone 11 is to provide consistent flow and temperature characteristics to lend operating stability and control to the process. In particular, temperature excursions in the reaction zone may be deleterious to catalyst and reactor life. Accordingly, temperature variances (measured radially across the reactor vessel 10 at the inlet to the steam reforming reaction zone 12) should generally be maintained at below 200° F., preferably less than 100° F., and more preferably less than 50° F. for best results.

The steam with hydrocarbon mixing zone 11 may comprise void volumes, mixing baffles, plates, nozzles, and/or inert or catalytically active material located above the reaction zone 12. The mixing zone 11 may also be incorporated into a burner configuration using the kinetic energy of the oxidation gases to entrain and mix with the reformer feed stream 8 as supplemented by any steam from conduit 9A.

The hydro-steam reforming process in accordance with the present invention contemplates reacting steam and natural gas at high temperatures and moderate pressures generally as follows:

Reaction 1→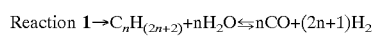

Reaction 2→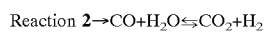

Reaction 1 is substantially endothermic while Reaction 2, in the vapor phase, is slightly exothermic. The combined reactions, including other smaller reactions that also generally take place, are endothermic overall. The present invention recovers substantially all of the exothermic energy produced from oxidizing the hydrogen-containing stream 13 to water for the endothermic steam reforming reaction.

The hydro-steam reforming reaction is conducted in the presence of a hydro-steam reforming catalyst at hydro-steam reforming conditions. The hydro-steam reforming catalyst generally comprises nickel, copper, or cobalt, alternatively or in combination with Noble metals such as platinum, palladium, rhodium, ruthenium, and iridium. The catalyst can be supported using supporting compositions comprising magnesia, magnesium aluminate, alumina, silica, zirconia, singly or in combination. Preferably, the steam reforming catalyst is a single metal such as nickel supported on a refractory carrier such as magnesia, magnesium aluminate, alumina, silica, or zirconia, singly or in combination, promoted by an alkali metal such as, but not limited to, potassium.

The hydro-steam reforming catalyst can be synthesized as granules, extrudates, tablets, or as a structured catalyst. The hydro-stream reforming catalyst may be deployed as a fixed bed or utilizing other catalyst means known to those skilled in the art. Preferably, the catalyst is deployed in a fixed bed configuration which may take the form of one or more platformed catalyst beds of catalyst configured within reaction zone 12. Alternatively, the catalyst may be applied or otherwise incorporated into the inner or outer walls of a tubular fixed bed system within reaction zone 12.

The hydrogen-containing stream 13 oxidation step is conducted so that, after mixing with reformer feed stream 8 (and steam from conduit 9A), the combined stream entering the reforming zone 12 is at the preferred temperature so as to initiate the hydro-steam reforming reaction, but in any event typically exceeds 2000° F. and commonly exceeds 2400° F. However, due to the plurality of reforming and related side reactions that are occurring in the mixing zone 11, each inextricably related to the composition and design configuration of any particular embodiment of the present invention and each possessing varying degrees of heat release or heat adsorption, an optimum reaction zone inlet temperature is less predictable and not the preferred process variable for controlling the process.

For purposes of the present invention, the reforming reaction zone 12 outlet temperature is the preferred control temperature and is generally maintained at a steady state temperature in excess of 1000° F., preferably ranging from about 1600° F. to about 2200° F., and more preferably ranging from about 1800° F. to about 2000° F. for best results. The reaction zone 12 pressure is generally maintained at between 50 psig and 1000 psig, preferably at between 150 psig and 800 psig, and more preferably at between 250 psig and 600 psig for best results.

In FIG. 1, the effluent 16 from the synthesis gas hydro-steam reforming step is directed to waste heat boiler 17 for removal of heat for the production of steam and the production of a cooler effluent 18. Cooler effluent 18 is directed to heat exchanger 2 for providing pre-reformer preheat resulting in a cooler stream 19 which may still be in excess of the temperature most desirable for the particular downstream reaction step contemplated. Stream 19 may be further cooled in a subsequent heat exchange or waste heat recovery unit 21 for producing a cooler effluent 20 or may be conveyed directly to downstream processing steps for conversion of synthesis gas to other products. FIG. 1 illustrates use of an integrated waste heat recovery system where boiler feed water 22 is fed to waste heat boiler 21 for producing hot boiler feed water or saturated steam stream 23. Hot boiler feed water or saturated steam stream 23 is directed to the previously described waste heat boiler 17 for producing saturated or superheated steam stream 24.

In FIG. 2, the effluent 16 from the synthesis gas hydro-steam reforming step is directed, in a concurrent or countercurrent manner, to high temperature gas heated reformer reactor 6 for heating the reformer feed and providing heat of reaction for the high temperature gas heated reforming reaction. The cooled effluent 16 exits reforming reactor 6 as cooled synthesis gas effluent 18 which is further cooled in heat exchanger 2A (for preheating pretreated natural gas feedstock 1) to cooler stream 19. Cooler stream 19 is further cooled in heat exchanger 21 producing cooler effluent 20.

Referring both to FIGS. 1 and 2, cooler effluent 20 is cooled to a temperature suitable for separating condensate from synthesis gas in cooler 25. The cooled synthesis gas 26 exiting the cooler 25 is directed to a condensate separator 27 for removing trace amounts of water and any contaminants that remain in the water phase 28 from the synthesis gas exiting the condensate separator 29. The condensate separator 27 may be configured as a vertical or horizontal drum with suitable level control equipment for reliable separation of a liquid phase comprising water from the synthesis gas 29.

The preferred process of the present invention is as illustrated in FIGS. 1 and 2, where synthesis gas stream 29 is directed to hydrogen separation system 30. The hydrogen separation system 30 can employ any of several process schemes known to those skilled in the art. Although the end use may define the hydrogen purity requirements and any selection of technology, suitable processes could include membrane separation, amine or hot potassium carbonate scrubbing systems, molecular sieves in pressure swing absorbers (PSA), or methanation reactors and the like, either singularly or in various combinations.

Cooled and separated effluent stream 29 from the synthesis gas hydro-steam reforming step of the present invention generally comprises hydrogen and carbon monoxide with lesser amounts of carbon dioxide, steam, methane and non-combustibles. In accordance with the process of the present invention, the molar ratio of hydrogen to carbon monoxide may range from about 2.5 to about 5.0 and, more commonly, will range from about 3.0 to about 4.5.

The higher molar ratio of hydrogen to carbon monoxide in the synthesis gas of cooled and separated effluent stream 29 combined with the use of hydrogen separation system 30 provides other synergistic benefits over oxidative and partial oxidative processes known in the prior art.

Many of the downstream processes that can be incorporated to monetize the synthesis gas produced in accordance with the present invention benefit from lower hydrogen to carbon monoxide molar ratios than the range of hydrogen to carbon monoxide exiting through cooled and separated effluent 29. For example, for Fischer Tropsch reactions, the hydrogen to carbon monoxide molar ratio is generally preferred to range from about 1.5 to 2.5 and more preferably from about 2.0 to about 2.1 for best results. For methanol, dimethyl ether or dimethoxymethane production, the hydrogen minus carbon dioxide to carbon monoxide plus carbon dioxide molar ratio is generally preferred to range from about 1.5 to about to about 2.5 and more preferably from about 2.0 to about 2.1 for best results.

The hydrogen separation system 30 separates the excess hydrogen from the hydro-steam reformed synthesis gas and recovers the excess hydrogen through conduit 31 to sustain the hydrogen-containing stream 13 oxidation step. In this manner, the molar ratio of hydrogen to carbon monoxide of the synthesis gas remaining after separation 32 can be particularly targeted so as to provide the optimum molar ratio for operation of the particular downstream process being employed while synergistically utilizing the excess hydrogen 31, as optionally supplemented by make up hydrogen from conduit 13B, to sustain the hydrogen oxidation step. Excess hydrogen from the hydrogen separation system 30 is generally conveyed through a compressor 33 so as to produce a stream 34 having sufficient operating pressure for recycling to the hydro-steam processing step via conduit 13A.

This embodiment of the present invention, incorporating the hydrogen separation system 30, provides other operation synergies as well. By controlling supplemental steam addition to the reactor 10 from conduit 9A and through control of the flow of the oxygen-containing stream 14, self-sustaining operation may be achieved wherein all of the hydrogen-containing stream oxidation step can be supplied from the hydrogen separation system 30 through conduits 34 and 13A without requiring supplemental hydrogen supply from conduit 13B. In this manner, the hydro-steam reforming process is substantially heat and mass balanced and less vulnerable to externally influenced operational upsets.

In an enhancement to this embodiment, sufficient hydrogen may be recovered to supply hydrogen through conduit 13C for catalyst reactivation, synthesis gas molar ratio control, and downstream product hydroprocessing/upgrading such as hydrotreating, hydrocracking, or isomerization commonly associated with Fischer Tropsch manufacture, or fuel for fuel cells, gas fired turbines and the like, maximizing efficiency and minimizing $CO_2$ emissions.

Another operational synergy of the present invention is that through utilization of the excess hydrogen produced from the hydrogen separation system 30 or through other hydrogen-containing stream sources 13B, the duty requirements of any hydro-steam reforming preheat furnace utilized in the process can be substantially reduced. Under most conditions, a hydro-steam reforming preheat furnace will not be required since the temperature required to initiate the hydro-steam reforming step as well as the energy to sustain the endothermic hydro-steam reforming reaction can be supplied entirely from the hydrogen-containing stream oxidation step.

In still another embodiment of the process of the present invention, the hydrogen-containing stream 13 (via conduit 13B) can be a cost-effective reprocessing mechanism for waste hydrogen streams. Processes for hydrogen manufacture, the manufacture of methanol, dimethyl ether, and/or dimethoxy methane, and Fischer Tropsch product upgrading may not and generally do not fully convert all of the synthesis gas directed to such processes into products. Unconverted synthesis gas as well as other waste hydrogen-containing streams from such downstream processes, such as, but not limited to the hydrogen purge stream from a hydroprocessing facility may be quite suitable for use as a component for the hydrogen-containing stream 13.

The hydro-steam reforming process in accordance with the present invention provides substantial benefits compared to the partial oxidation, autothermal, gas heated, and steam reforming processes in the prior art.

The hydro-steam reforming process in accordance with the present invention benefits from the oxidation of hydrogen to steam for directly supplying the energy necessary to initiate and sustain the endothermic steam reforming heat of reaction. The oxidation reaction product of a hydrogen-containing stream is substantially friendlier to the environment than steam reforming processes which externally oxidize hydrocarbon (to greenhouse gases such as carbon dioxide) to meet their energy requirements. Moreover, the oxidation products of the hydrogen-containing stream are consumed in the synthesis gas reaction compared to prior art steam reforming processes which exhaust the hydrocarbon combustion products (carbon dioxide and water) to the atmosphere.

The hydro-steam reforming process in accordance with the present invention results in substantially improved operational reliability. The process of the present invention oxidizes hydrogen to provide the energy necessary to initiate and sustain the hydro-steam reforming reaction. Partial oxidation, autothermal, and gas heated reforming processes oxidize hydrocarbon to sustain their synthesis gas conversion reactions. The oxidation or partial oxidation of hydrocarbon to synthesis gas, carbon dioxide or water results in the formation of coke, soot, and coke and soot precursors. These materials generally contribute to catalyst deactivation, catalyst bed pressure drop/plugging, and reduced plant operability.

The hydro-steam reforming process in accordance with the present invention can be operated in a manner so as to manufacture its own hydrogen requirements. The hydro-steam reforming process manufactures synthesis gas at a higher molar ratio of hydrogen to carbon monoxide than the stoichiometrically optimum ratio required for many of the known downstream GTL processes. In this manner, hydrogen separation steps may be incorporated to remove any excess hydrogen which may then be directed for the hydro-steam reforming reaction. Similarly, the hydrogen separation step may be executed in a manner to target the optimum synthesis gas molar ratio of hydrogen to carbon monoxide for the particular downstream GTL process.

The hydro-steam reforming process in accordance with the present invention can be operated in a manner so as to be a net consumer (or producer) of water/steam. Since many GTL processes, such as, but not limited to, Fischer Tropsch, methanol and DME manufacture generally operate as net exporters of water/steam, this water consumption capability is a synergistically beneficial feature of the hydro-steam reforming process resulting in less overall process water produced that would otherwise need to be remediated and disposed of.

The hydro-steam reforming process in accordance with the present invention can be designed in such a manner so as to eliminate the need for an external fired furnace. Through the optional use of supplemental steam and hydrogen addition, the hydro-steam process can generate sufficient hydrogen to entirely initiate and sustain the endothermic steam reforming reaction as well as provide sufficient hydro-steam reforming reactor preheat to eliminate the external fired furnaces generally required to operate steam reformers.

The present invention is described in further detail in connection with the following examples, it being understood that the same is for purposes of illustration and not limitation.

EXAMPLES

The process, substantially in accordance with the present invention as illustrated in FIG. 1 (Example 1) and FIG. 2 (Example 2) was compared against conventional steam/methane reforming technology (Example 3). The comparisons were made based on detailed computer simulations using HYSYS 2.4 software developed by Hyprotech. Each configuration maintained the same constants as follows:
- a natural gas volumetric feed rate of 500 MMSCFD;
- a natural gas carbon dioxide feed concentration of 0.00 volume percent;
- a hydro-steam reforming reactor or steam/methane reforming reactor outlet temperature of 1950 F;
- a hydro-steam reforming reactor or steam/methane reforming reactor outlet pressure of 460 psia;

The exported synthesis gas was produced at the same molar ratios of hydrogen to carbon monoxide so as to illustrate the substantial benefits provided through the hydro-steam process of the present invention.

Example 1

A hydro-steam reforming process utilizing a hydro-steam reforming step in accordance with the present invention and as illustrated in FIG. 1 was simulated for identifying the benefits of the present invention compared to conventional steam/methane reformers. Simulations were prepared for synthesis gas hydrogen to carbon monoxide molar ratios of 2.0:1, 2.05:1 and 2.1:1 respectively.

The heat and mass balances for the Hydro-Steam Reforming Case having a synthesis gas molar ratio of 2.1:1 is set forth in Table 1. The Stream Numbers set forth in Table 1 correlate with the stream numbers or devices identified in FIG. 1.

The performance criteria for the Hydro-Steam Reforming Case for all three hydrogen to carbon monoxide molar ratios as well as a comparison of performance criteria for each of Examples 1–3 for all hydrogen to carbon monoxide molar ratios is provided in the Example Analysis and in Table 4 below.

TABLE 1

| Dear Mom and Dad, Stream No. | 1 | 5 | 4 | 8 | 13 | 14 | 9A |
|---|---|---|---|---|---|---|---|
| Description | Natural Gas Feed | Steam To Feed | Pre-Ref or H.T. Ref. Feed | Pre-Ref or H.T. Ref. Effluent | Hydrogen for Oxidation | Oxygen for Oxidation | Steam to Reformer |
| Mass Flow (lbs/hr) | 1,001,960 | 46,839 | 1,048,800 | 1,048,800 | 173,658 | 1,402,859 | 1,459,223 |
| Molar Flow (Moles/hr) | 54,902 | 2,600 | 57,502 | 62,345 | 86,140 | 43,949 | 81,000 |
| Gas Flow (MMSCFD) | 500 | 23.7 | 523.7 | 567.8 | 784.50 | 400.3 | 737.7 |
| Composition (Mole %) | | | | | | | |
| Methane | 90.53 | 0.00 | 86.43 | 94.50 | 0.00 | 0.00 | 0.00 |
| Ethane | 4.21 | 0.00 | 4.02 | 1.02 | 0.00 | 0.00 | 0.00 |
| Propane | 2.16 | 0.00 | 2.06 | 0.03 | 0.00 | 0.00 | 0.00 |
| i-Butane | 0.53 | 0.00 | 0.50 | 0.00 | 0.00 | 0.00 | 0.00 |
| n-Butane | 1.05 | 0.00 | 1.01 | 0.00 | 0.00 | 0.00 | 0.00 |
| i-Pentane | 0.11 | 0.00 | 0.10 | 0.00 | 0.00 | 0.00 | 0.00 |
| n-Pentane | 0.32 | 0.00 | 0.30 | 0.00 | 0.00 | 0.00 | 0.00 |
| n-Hexane | 0.05 | 0.00 | 0.05 | 0.00 | 0.00 | 0.00 | 0.00 |
| Water | 0.53 | 100.00 | 5.02 | 0.00 | 0.00 | 0.00 | 100.00 |
| Hydrogen | 0.00 | 0.00 | 0.00 | 0.10 | 100.00 | 0.00 | 0.00 |
| Carbon Monoxide | 0.00 | 0.00 | 0.00 | 3.14 | 0.00 | 0.00 | 0.00 |
| Carbon Dioxide | 0.00 | 0.00 | 0.00 | 0.75 | 0.00 | 0.00 | 0.00 |
| Carbon | 0.00 | 0.00 | 0.00 | 0.00 | 0.00 | 0.00 | 0.00 |
| Oxygen | 0.00 | 0.00 | 0.00 | 0.00 | 0.00 | 98.00 | 0.00 |
| Nitrogen | 0.53 | 0.00 | 0.50 | 0.46 | 0.00 | 2.00 | 0.00 |
| Temperature (° F.) | 150 | 850 | 849 | 844 | 450 | 150 | 850 |
| Pressure (PSIA) | 500 | 500 | 495 | 480 | 500 | 500 | 500 |

| Dear Mom and Dad, Stream No. | 15 | 12 | 16 | 29 | 31 | 32 |
|---|---|---|---|---|---|---|
| Description | Burner Effluent | Reaction Zone Inlet | Reaction Zone Outlet | Synthesis Gas W/o Condensate | Hydrogen | Synthesis Gas Product |
| Mass Flow (lbs/hr) | 1,576,441 | 4,084,465 | 4,084,514 | 2,374,053 | 173,658 | 2,200,396 |
| Molar Flow (Moles/hr) | 87,019 | 230,365 | 348,271 | 253,380 | 86,140 | 167,240 |
| Gas Flow (MMSCFD) | 792.5 | 2,098.1 | 3,171.9 | 2,307.7 | 784.5 | 1,523.1 |
| Composition (Mole %) | | | | | | |
| Methane | 0.00 | 25.57 | 0.37 | 0.51 | 0.00 | 0.78 |
| Ethane | 0.00 | 0.28 | 0.00 | 0.00 | 0.00 | 0.00 |
| Propane | 0.00 | 0.01 | 0.00 | 0.00 | 0.00 | 0.00 |
| i-Butane | 0.00 | 0.00 | 0.00 | 0.00 | 0.00 | 0.00 |
| n-Butane | 0.00 | 0.00 | 0.00 | 0.00 | 0.00 | 0.00 |
| i-Pentane | 0.00 | 0.00 | 0.00 | 0.00 | 0.00 | 0.00 |
| n-Pentane | 0.00 | 0.00 | 0.00 | 0.00 | 0.00 | 0.00 |
| n-Hexane | 0.00 | 0.00 | 0.00 | 0.00 | 0.00 | 0.00 |
| Water | 98.99 | 72.56 | 27.56 | 0.45 | 0.00 | 0.69 |

TABLE 1-continued

| | | | | | | |
|---|---|---|---|---|---|---|
| Hydrogen | 0.00 | 0.03 | 54.11 | 74.37 | 100.00 | 61.16 |
| Carbon Monoxide | 0.00 | 0.85 | 13.99 | 19.22 | 0.00 | 29.13 |
| Carbon Dioxide | 0.00 | 0.20 | 3.64 | 4.98 | 0.00 | 7.55 |
| Carbon | 0.00 | 0.00 | 0.00 | 0.00 | 0.00 | 0.00 |
| Oxygen | 0.00 | 0.00 | 0.00 | 0.00 | 0.00 | 0.00 |
| Nitrogen | 1.01 | 0.51 | 0.34 | 0.46 | 0.00 | 0.70 |
| Temperature (° F.) | *5357 | *3347 | 1950 | 120 | 120 | 120 |
| Pressure (PSIA) | 480 | 480 | 460 | 440 | 50 | 432 |

*Predicted temperature does not take into account gas phase homogenous reactions and burner design criteria that may alter actual temperatures Example 2

A hydro-steam reforming process utilizing a gas heated high temperature reformer combined with a hydro-steam reforming step in accordance with the present invention and as illustrated in FIG. 1 was simulated for identifying the benefits of the invention compared to conventional steam/methane reformers. Simulations were prepared for synthesis gas hydrogen to carbon monoxide molar ratios of 2.0:1, 2.05:1 and 2.1:1 respectively.

The heat and mass balances for the Hydro-Steam Reforming Case having a synthesis gas molar ratio of 2.1:1 is set forth in Table 2. The Stream Numbers set forth in Table 2 correlate with the stream numbers or devices identified in FIG. 2.

The performance criteria for the Hydro-Steam Reforming Case utilizing a gas heated high temperature reformer combined with a hydro-steam reforming step for all hydrogen to carbon monoxide molar ratios as well as a comparison of the performance criteria for each of Examples 1–3 for all hydrogen to carbon monoxide molar ratios is provided in the Example Analysis and in Table 4 below.

TABLE 2

| Stream No. | 1 | 5 | 4 | 8 | 13/31 | 14 |
|---|---|---|---|---|---|---|
| Description | Natural Gas Feed | Steam To Feed | Pre-Ref or H.T. Ref. Feed | Pre-Ref or H.T. Ref. Effluent | Hydrogen for Oxidation | Oxygen for Oxidation |
| Mass Flow (lbs/hr) | 1,001,960 | 683,673 | 1,685,633 | 1,685,642 | 123,409 | 996,934 |
| Molar Flow Moles/hr) | 54,902 | 37,950 | 92,852 | 118,693 | 61,215 | 31,232 |
| Gas Flow (MMSCFD) | 500.0 | 345.6 | 845.7 | 1081.0 | 557.5 | 284.4 |
| Composition (Mole %) | | | | | | |
| Methane | 90.53 | 0.00 | 53.53 | 41.90 | 0.00 | 0.00 |
| Ethane | 4.21 | 0.00 | 2.49 | 0.01 | 0.00 | 0.00 |
| Propane | 2.16 | 0.00 | 1.28 | 0.00 | 0.00 | 0.00 |
| i-Butane | 0.53 | 0.00 | 0.31 | 0.00 | 0.00 | 0.00 |
| n-Butane | 1.05 | 0.00 | 0.62 | 0.00 | 0.00 | 0.00 |
| i-Pentane | 0.11 | 0.00 | 0.06 | 0.00 | 0.00 | 0.00 |
| n-Pentane | 0.32 | 0.00 | 0.19 | 0.00 | 0.00 | 0.00 |
| n-Hexane | 0.05 | 0.00 | 0.03 | 0.00 | 0.00 | 0.00 |
| Water | 0.53 | 100.00 | 41.18 | 16.59 | 0.00 | 0.00 |
| Hydrogen | 0.00 | 0.00 | 0.00 | 30.37 | 100.00 | 0.00 |
| Carbon Monoxide | 0.00 | 0.00 | 0.00 | 6.15 | 0.00 | 0.00 |
| Carbon Dioxide | 0.00 | 0.00 | 0.00 | 4.74 | 0.00 | 0.00 |
| Carbon | 0.00 | 0.00 | 0.00 | 0.00 | 0.00 | 0.00 |
| Oxygen | 0.00 | 0.00 | 0.00 | 0.00 | 0.00 | 98.00 |
| Nitrogen | 0.53 | 0.00 | 0.31 | 0.24 | 0.00 | 2.00 |
| Temperature (° F.) | 150 | 469 | 368 | 1350 | 120 | 250 |
| Pressure (PSIA) | 500 | 500 | 500 | 480 | 500 | 500 |

| Stream No. | 15 | 12 | 16 | 29 | 32 |
|---|---|---|---|---|---|
| Description | Burner Effluent Inlet | Reaction Zone Outlet | Reaction Zone Condensate | Synthesis Gas w/o Product | Synthesis Gas |
| Mass Flow (lbs/hr) | 1,120,288 | 2,805,930 | 2,805,971 | 2,179,690 | 2,056,281 |
| Molar Flow Moles/hr) | 61,839 | 180,533 | 270,736 | 235,981 | 174,766 |
| Gas Flow (MMSCFD) | 563.2 | 1644.2 | 2465.7 | 2149.2 | 1591.7 |
| Composition (Mole %) | | | | | |
| Methane | 0.00 | 27.55 | 1.72 | 1.97 | 2.66 |
| Ethane | 0.00 | 0.01 | 0.00 | 0.00 | 0.00 |
| Propane | 0.00 | 0.00 | 0.00 | 0.00 | 0.00 |

TABLE 2-continued

| | | | | | |
|---|---|---|---|---|---|
| i-Butane | 0.00 | 0.00 | 0.00 | 0.00 | 0.00 |
| n-Butane | 0.00 | 0.00 | 0.00 | 0.00 | 0.00 |
| i-Pentane | 0.00 | 0.00 | 0.00 | 0.00 | 0.00 |
| n-Pentane | 0.00 | 0.00 | 0.00 | 0.00 | 0.00 |
| n-Hexane | 0.00 | 0.00 | 0.00 | 0.00 | 0.00 |
| Water | 98.99 | 44.82 | 13.23 | 0.46 | 0.62 |
| Hydrogen | 0.00 | 19.97 | 63.28 | 72.60 | 63.00 |
| Carbon Monoxide | 0.00 | 4.04 | 19.36 | 22.21 | 30.00 |
| Carbon Dioxide | 0.00 | 3.12 | 2.07 | 2.37 | 3.20 |
| Carbon | 0.00 | 0.00 | 0.00 | 0.00 | 0.00 |
| Oxygen | 0.00 | 0.00 | 0.00 | 0.00 | 0.00 |
| Nitrogen | 1.01 | 0.51 | 0.34 | 0.39 | 0.52 |
| Temperature (° F.) | *5330 | *3399 | 1950 | 120 | 120 |
| Pressure (PSIA) | 500 | 480 | 460 | 430 | 430 |

*Predicted temperature does not take into account gas phase homogenous reactions and burner design criteria that may alter actual temperatures

Example 3

A conventional steam/methane reforming process was simulated for the purpose serving as a base case (Base Case) for comparison with the processes of the present invention (Examples 1 and 2). Simulations were prepared for synthesis gas hydrogen to carbon monoxide molar ratios of 2.0:1, 2.05:1 and 2.1:1 respectively.

The stream/methane reforming process was configured as closely to the process flow configuration of the process of the present invention as reasonable with the differences between the Base Case and the inventive cases directed to the critical differences between the technologies (in order to ensure a clean and valid comparison). Instead of incorporating the hydro-steam reactor 10 (see FIG. 1) or the gas heated high temperature reformer 6 combined with the hydro-steam reactor 10 (see FIG. 2) of the present invention, the steam/methane reformer utilized a steam/methane reforming reactor wherein the energy requirements for the steam/methane reforming reaction were met by the combustion of a portion of the natural gas feedstock external of and to the natural gas feedstock reforming reaction. A second distinction between the Base Case and the processes of the present invention is that all of the products of the combustion reaction providing the energy requirements necessary to sustain the steam/methane reforming reaction were exhausted to atmosphere rather than consumed into the process. A third distinction between Base Case and the processes of the present invention is that all of the steam requirements for the steam/methane reforming reaction were met from the addition of steam from external sources and not the hydro-steam oxidation step.

The heat and mass balances for the Base Case having a synthesis gas molar ratio of 2.1:1 is set forth in Table 3. A comparison of the performance criteria for all hydrogen to carbon monoxide molar ratios as well as a comparison of the performance criteria for each of Examples 1–3 for all hydrogen to carbon monoxide molar ratios is provided in the Example Analysis and in Table 4 below. The Stream Numbers set forth in Table 3, to the extent that they correlate with the process of FIG. 1, are referenced to FIG. 1. Otherwise, the Stream Numbers are left blank.

TABLE 3

| Stream No. | 1 | 8 | 9A | 16 | 29 |
|---|---|---|---|---|---|
| Description | Natural Gas Feed | Natural Gas To Reformer Fuel | Natural Gas To Reformer | Steam To Reformer | Reaction Zone Effluent | Synthesis Gas w/o Condensate |
| Mass Flow (lbs/hr) | 1,001,960 | 103,676 | 898,283 | 2,741,898 | 3,640,227 | 2,106,196 |
| Molar Flow (Moles/hr) | 54,902 | 5,681 | 49,221 | 152,200 | 311,460 | 226,356 |
| Gas Flow (MMSCFD) | 500 | 51.7 | 448.3 | 1,386.2 | 2,836.6 | 2,061.5 |
| Composition (Mole %) | | | | | | |
| Methane | 90.53 | 90.53 | 90.53 | 90.53 | 0.38 | 0.52 |
| Ethane | 4.21 | 4.21 | 4.21 | 4.21 | 0.00 | 0.00 |
| Propane | 2.16 | 2.16 | 2.16 | 2.16 | 0.00 | 0.00 |
| i-Butane | 0.53 | 0.53 | 0.53 | 0.53 | 0.00 | 0.00 |
| n-Butane | 1.05 | 1.05 | 1.05 | 1.05 | 0.00 | 0.00 |
| i-Pentane | 0.11 | 0.11 | 0.11 | 0.11 | 0.00 | 0.00 |
| n-Pentane | 0.32 | 0.32 | 0.32 | 0.32 | 0.00 | 0.00 |
| n-Hexane | 0.05 | 0.05 | 0.05 | 0.05 | 0.00 | 0.00 |
| Water | 0.53 | 0.53 | 0.53 | 0.53 | 27.64 | 0.45 |
| Hydrogen | 0.00 | 0.00 | 0.00 | 0.00 | 54.24 | 74.63 |
| Carbon Monoxide | 0.00 | 0.00 | 0.00 | 0.00 | 14.02 | 19.29 |
| Carbon Dioxide | 0.00 | 0.00 | 0.00 | 0.00 | 3.65 | 5.00 |
| Carbon | 0.00 | 0.00 | 0.00 | 0.00 | 0.00 | 0.00 |
| Oxygen | 0.00 | 0.00 | 0.00 | 0.00 | 0.00 | 0.00 |
| Nitrogen | 0.53 | 0.53 | 0.53 | 0.53 | 0.08 | 0.11 |
| Temperature (° F.) | 844 | 844 | 844 | 844 | 1,950 | 120 |
| Pressure (PSIA) | 485 | 485 | 485 | 485 | 460 | 440 |

TABLE 3-continued

| Stream No. | | | | |
|---|---|---|---|---|
| Description | Hydrogen To Reformer Fuel | Air for Reformer Combustion | Combustion Gases To Atmosphere | Synthesis Gas Product |
| Mass Flow (lbs/hr) | 155,682 | 7,951,248 | 8,210,917 | 1,950,515 |
| Molar Flow (Moles/hr) | 77,223 | 275,604 | 320,328 | 149,133 |
| Gas Flow (MMSCFD) | 703.3 | 2,510.10 | 2,917.4 | 1,358.2 |
| Composition (Mole %) | | | | |
| Methane | 0.00 | 0.00 | 0.00 | 7.90 |
| Ethane | 0.00 | 0.00 | 0.00 | 0.00 |
| Propane | 0.00 | 0.00 | 0.00 | 0.00 |
| i-Butane | 0.00 | 0.00 | 0.00 | 0.00 |
| n-Butane | 0.00 | 0.00 | 0.00 | 0.00 |
| i-Pentane | 0.00 | 0.00 | 0.00 | 0.00 |
| n-Pentane | 0.00 | 0.00 | 0.00 | 0.00 |
| n-Hexane | 0.00 | 0.00 | 0.00 | 0.00 |
| Water | 0.00 | 0.00 | 27.90 | 0.69 |
| Hydrogen | 100.00 | 0.00 | 0.00 | 61.49 |
| Carbon Monoxide | 0.00 | 0.00 | 0.00 | 29.28 |
| Carbon Dioxide | 0.00 | 0.00 | 2.02 | 7.59 |
| Carbon | 0.00 | 0.00 | 0.00 | 0.00 |
| Oxygen | 0.00 | 21.00 | 2.10 | 0.00 |
| Nitrogen | 0.00 | 79.00 | 67.98 | 0.17 |
| Temperature (° F.) | 120 | 100 | 1,100 | 120 |
| Pressure (PSIA) | 50 | 50 | 15 | 435 |

Example Analysis

A comparison of the performance criteria for the process of the present invention compared to a Base Case representing steam/methane reforming is set forth in Table 4.

For purposes of interpreting Table 4, the performance criteria shall be defined as follows:

"Total Steam" shall mean the total moles of steam entering the process through such as, but not limited to the presence of water in the natural gas feed, through steam added to the pre-reforming or gas heated high temperature reforming step, or through steam added to a steam or hydro-steam reformer, including by way of the oxidation of hydrogen to water/steam.

"Reactive Carbon" shall mean the total moles of carbon present in the natural gas feed that is present in a reactive form such as a hydrocarbon. Carbon dioxide shall not be considered to possess reactive carbon.

"Total Steam to Carbon Ratio" shall mean Total Steam divided by Reactive Carbon.

"External Steam" shall mean the total moles of steam entering the process through such as, but not limited to the presence of water in the natural gas feed, through steam added to the pre-reforming or gas heated high temperature reforming step, or through steam added to a steam or hydro-steam reformer, but not including steam added by way of the oxidation of hydrogen to water/steam for the hydro-steam reforming step.

"External Steam/Carbon Ratio" shall mean External Steam divided by Reactive Carbon.

"Raw Synthesis Gas $H_2$/CO Ratio" shall mean the molar ratio of hydrogen to carbon monoxide in the raw synthesis gas prior to removal of water by way of condensate separation and prior to hydrogen separation.

"Export Synthesis Gas $H_2$/CO Ratio" shall mean the molar ratio of hydrogen to carbon monoxide in the exported synthesis gas after removal of water by way of condensate separation and any other final treating of synthesis gas or hydrogen removal prior to export or use.

"$O_2$/Carbon Ratio" shall mean the moles of pure oxygen added to the process (not including oxygen introduced by addition of water) divided by the Reactive Carbon.

"CO Formation, %" shall mean the moles of carbon monoxide present in the Raw Synthesis Gas divided by the Reactive Carbon.

"$CO_2$ formation, %" shall mean the moles of carbon dioxide present in the Raw Synthesis Gas divided by the Reactive Carbon.

"Unconverted Methane, %" shall mean the moles of methane present in the Raw Synthesis Gas divided by the Reactive Carbon.

"Condensate" shall mean the moles of water and other condensibles removed from Raw Synthesis Gas.

"Net Steam Consumed" shall mean the Total Steam less Condensate.

"Net Water Make" shall mean Condensate less External Steam.

"Steam Added" shall mean Total Steam less the presence of water in the natural gas feed and the addition of water via steam added to a steam or hydro-steam reformer by way of the oxidation of hydrogen to water/steam.

"Water Reacted, % of Total Feed" shall mean Total Steam less the moles of water present in the reforming reactor effluent divided by the Total Steam multiplied by 100 percent.

TABLE 4

| | Example No. | | | | | | | | |
|---|---|---|---|---|---|---|---|---|---|
| | 1 | | | 2 | | | 3 | | |
| Performance Criteria | | | | | | | | | |
| Synthesis Gas H₂/CO Molar Ratio (Steam 32) | 2.00 | 2.05 | 2.10 | 2.00 | 2.05 | 2.10 | 2.00 | 2.05 | 2.10 |
| Internal Synthesis Gas H₂/CO Molar Ratio (Stream 29) | 3.638 | 3.751 | 3.868 | 3.165 | 3.216 | 3.628 | 3.638 | 3.751 | 3.869 |
| Burner Adiabatic Flame Temp (° F.) | 5,357 | 5,357 | 5,357 | 5,330 | 5,330 | 5,330 | N/A | N/A | N/A |
| Reaction Zone Inlet Temp (° F.) | 3,423 | 3,385 | 3,347 | 3,448 | 3,425 | 3,399 | N/A | N/A | N/A |
| Steam/Water Criteria | | | | | | | | | |
| Steam Added | 57,500 | 69,000 | 81,000 | 25,850 | 31,800 | 37,950 | 128,650 | 140,200 | 152,200 |
| Net Water Make | 10,846 | 10,866 | 10,957 | −935 | −2,228 | −3,492 | −64,519 | −65,868 | −67,137 |
| Water Reacted; % Feed | 49.48 | 46.36 | 43.54 | 69.76 | 66.78 | 63.97 | 49.47 | 46.36 | 43.53 |
| Total Steam/Carbon Ratio | 2.285 | 2.495 | 2.713 | 1.385 | 1.485 | 1.587 | 2.285 | 2.495 | 2.713 |
| External Steam/Carbon Ratio | 0.964 | 1.147 | 1.338 | 0.417 | 0.512 | 0.610 | 2.285 | 2.495 | 2.713 |
| Oxygen Criteria | | | | | | | | | |
| Oxygen Added/Tons/Day (Stream 14) | 14,427 | 14,718 | 15,004 | 10,570 | 10,628 | 10,662 | 0.00 | 0.00 | 0.00 |
| Oxygen/Carbon Ratio | 0.661 | 0.674 | 0.687 | 0.484 | 0.487 | 0.488 | 0.00 | 0.00 | 0.00 |
| Conversion Criteria | | | | | | | | | |
| Unconverted Methane, % (Stream 32) | 3.14 | 2.54 | 2.08 | 10.13 | 8.64 | 7.42 | 3.16 | 2.56 | 2.08 |
| CO₂ Formation, % | 16.20 | 18.21 | 20.20 | 6.76 | 7.84 | 8.94 | 16.20 | 18.21 | 20.21 |
| CO Formation, % | 80.66 | 79.25 | 77.72 | 83.11 | 83.52 | 83.64 | 80.64 | 79.24 | 77.71 |
| Combustion Gases Emitted to Atmosphere (lb/hr) | 0.00 | 0.00 | 0.00 | 0.00 | 0.00 | 0.00 | 7,925,021 | 8,068,912 | 8,210,917 |

Analysis of Examples 1 through 3 (Tables 1 through 3) illustrates that the hydro-steam processes of the present invention (Examples 1 and 2) result in the manufacture of more synthesis gas by weight at the same molar ratio of hydrogen to carbon monoxide (2.1:1) than steam/methane reforming. The hydro-steam process of the present invention internally produced a substantial portion of the energy required to sustain the reforming reaction whereas, for steam/methane reforming, a portion of the natural gas feed (103,676 pounds/hr) must be directed to the steam/methane reformer for combustion.

The hydro-steam processes of the present invention as illustrated in Examples 1 and 2 and Tables 1 and 2 produce a synthesis gas containing substantially less impurities than the steam/methane reforming process as illustrated in Example 3 and Table 3. The processes of the present invention as described in Examples 1 and 2 produce a synthesis gas product containing 9.72 mole percent and 7.00 mole percent of components other than hydrogen and carbon monoxide. The steam/methane reforming process described in Example 3 produces a synthesis gas product containing 16.35 mole percent of components other than hydrogen and carbon monoxide. Higher synthesis gas purity translates into lower processing costs and/or lower capital requirements.

The hydro-steam processes of the present invention as illustrated in Examples 1 and 2 and Tables 1 and 2 do not emit combustion products comprising green house gases to the atmosphere. The steam/methane reforming process illustrated in Example 3 and Table 3 emits 8,210,917 pounds/hour of combustion products to the atmosphere of which 2.02 mole percent of this is carbon dioxide. For the steam/methane process described in Example 3, a substantial portion of the steam/methane reformer feed is hydrogen. Where the steam/methane reformer fuel contains more hydrocarbon, the carbon dioxide emissions would likely increase even further.

The hydro-steam process of the present invention as illustrated in Examples 1 and 2 and Tables 1 and 2 consume substantially less external steam than the steam/methane reforming process described in Example 3 and Table 3. For a synthesis gas hydrogen to carbon monoxide molar ratio of 2.1, the hydro-steam processes of the present invention (Examples 1 and 2) require the addition of 81,000 pounds/hr and 37,950 pounds/hr of steam and operate at an External Steam/Carbon Ratio of 1.338 and 0.610 respectively. The steam/methane reforming process (Example 3) requires the addition of 152,200 pounds/hr of steam and operates at an External Steam/Carbon Ratio of 2.713. The steam/methane reforming process requires nearly double the External Steam as the hydro-steam process of the present invention as set forth in Example 1 and nearly four times as much as the External Steam required for the present invention as set forth in Example 2.

The gas heated high temperature hydro-steam process of the present invention as illustrated in Example 2 provides further benefits over the hydro-steam process of Example 1 and the steam/methane reforming process of Example 3.

The gas heated high temperature hydro-steam process of Example 2 can operate with a substantially lower level of carbon dioxide production. Referring to Table 4, carbon dioxide formation percent is consistently maintained below 9 while the steam/methane reforming process of Example 3 and the hydro-steam process of Example 1 range from 16 to 21 percent. Lower production levels of carbon dioxide result in a more thermally efficient synthesis gas manufacturing process.

The gas heated high temperature hydro-steam process of Example 2 operates with substantially lower oxygen requirements than the hydro-steam process of Example 1. Referring to Tables 1 and 2, the gas heated high temperature hydro-steam process of Example 2 requires less than 11 tons per day of oxygen whereas the hydro-steam process of Example 1 requires in excess of 14 tons per day. Since oxygen plants are generally erected in trains, lower oxygen requirements not only results in lower input costs but may also substantially lower capital costs by reducing the number of oxygen trains required to sustain the process.

Other embodiments and benefits of the invention will be apparent to those skilled in the art from a consideration of this specification or from practice of the invention disclosed herein. It is intended that this specification be considered as exemplary only with the true scope and spirit of the invention being indicated by the following claims.

That which is claimed is:

1. A process for producing synthesis gas comprising the steps of:

reacting a hydrogen-containing stream with an oxygen-containing stream and producing an oxidized stream comprising water;

contacting a feedstream comprising hydrocarbon or hydrocarbon comprising at least one atom of oxygen with said oxidized stream comprising water and forming a reforming feedstream; and passing said reforming feedstream into a reforming reaction zone at reforming reaction conditions and producing a synthesis gas product.

2. The process of claim 1 wherein said oxygen-containing stream comprises oxygen and said oxygen-containing stream is reacted in an amount ranging from about 80 mole % to about 105 mole % of the stoichiometrically required amount of oxygen required to fully oxidize said hydrogen-containing stream to water and carbon dioxide.

3. The process of claim 1 wherein said hydrogen-containing stream comprises at least 70 mole percent hydrogen and more than 60 mole % of the hydrogen-containing stream is oxidized to water, carbon dioxide or both in said reacting step.

4. The process of claim 1 wherein water is added to at least one stream selected from the group consisting of said oxygen-containing stream, said hydrogen-containing stream and said feedstream comprising hydrocarbon or hydrocarbon comprising at least one atom of oxygen.

5. The process of claim 4 wherein:

said reacting step is conducted in a burner;

said water is added to at least one stream selected from the group consisting of said oxygen-containing stream and said hydrogen-containing stream; and said water is processed through said burner so as to reduce the adiabatic flame temperature exiting said burner compared to the adiabatic flame temperature exiting said burner in the absence of said water.

6. The process of claim 1 wherein:

said hydrogen-containing stream comprises at least 70 mole percent hydrogen;

said feedstream comprising hydrocarbon or hydrocarbon comprising at least one atom of oxygen comprises less than 2 mole percent molecular oxygen; and said oxygen-containing stream comprises at least 70 mole percent oxygen and said oxygen-containing stream is reacted in said reacting step in an amount ranging from about 80 mole % to about 105 mole % of the stoichiometrically required amount of oxygen required to fully oxidize said hydrogen-containing stream to water, carbon dioxide or both.

7. The process of claim 1 wherein:

said reforming reaction zone comprises a reforming catalyst;

said reforming reaction conditions comprise a reaction zone inlet temperature of at least 2000° F. and a reaction zone pressure of from about 150 psia to about 600 psia; and said synthesis gas product exiting said reforming reaction zone has a molecular hydrogen to carbon monoxide molar ratio of from about 2.5:1 to about 5:1.

8. The process of claim 7 wherein said reforming reaction conditions comprise a reaction zone outlet temperature ranging from about 1600° F. to about 2200° F.

9. The process of claim 1 wherein at least a portion of said synthesis gas product exiting said steam reforming reaction zone is directed to a hydrogen separation step for separating said synthesis gas into a stream comprising hydrogen and a second synthesis gas product and at least a portion of said stream comprising hydrogen is added to said hydrogen-containing stream.

10. The process of claim 7 wherein said second synthesis gas product has a hydrogen to carbon monoxide molar ratio of from about 1.5:1 to about 2.5:1.

11. A process for producing synthesis gas comprising the steps of:

oxidizing at least a portion of a hydrogen-containing stream with an oxygen-containing stream in an amount ranging from about 80 mole % to about 105 mole % of the stoichiometrically required amount of oxygen required to fully oxidize said hydrogen-containing stream to water, carbon dioxide or both and producing an oxidized stream comprising water at elevated temperature;

contacting a feedstream comprising hydrocarbon or hydrocarbon comprising at least one atom of oxygen with said oxidized stream comprising water and forming a reforming feedstream; and passing said reforming feedstream into a steam reforming reaction zone at steam reforming reaction conditions and producing a synthesis gas product.

12. The process of claim 11 wherein said oxygen-containing stream comprises oxygen and said oxygen-containing stream is reacted in an amount ranging from about 90 mole % to about 102 mole % of the stoichiometrically required amount of oxygen required to fully oxidize said hydrogen-containing stream to water and carbon dioxide.

13. The process of claim 11 wherein:

said hydrogen-containing stream comprises at least 80 mole percent hydrogen;

said feedstream comprising hydrocarbon or hydrocarbon comprising at least one atom of oxygen comprises water and less than 2 mole percent molecular oxygen;

said oxygen-containing stream comprises at least 90 mole percent oxygen; and more than 60 mole % of said hydrogen-containing stream is oxidized to water, carbon dioxide or both in said reacting step.

14. The process of claim 11 wherein:

said steam reforming reaction zone comprises a reforming catalyst further comprising at least one active metal selected from the group consisting of nickel, rhodium, copper, and cobalt;

said steam reforming reaction conditions comprise a reaction zone inlet temperature of at least 2000° F. and an average reaction zone pressure of from about 150 psia to about 600 psia; and said synthesis gas product exiting said steam reforming reaction zone has a hydrogen to carbon monoxide molar ratio of from about 2.5:1 to about 5:1.

15. The process of claim 11 wherein at least a portion of said synthesis gas product exiting said steam reforming reaction zone is directed to a hydrogen separation step for separating said synthesis gas into a stream comprising hydrogen and a second synthesis gas product and at least a portion of said stream comprising hydrogen is added to said hydrogen-containing stream.

16. The process of claim 15 wherein said second synthesis gas product has a hydrogen to carbon monoxide molar ratio of from about 1.5:1 to about 2.5:1.

17. A process for producing synthesis gas comprising the steps of:

oxidizing at least a portion of a hydrogen-containing stream with a stream comprising oxygen such that more than 60 mole % of said hydrogen-containing stream is oxidized to water, carbon dioxide or both in said reacting step and producing an oxidized stream comprising water at elevated temperature;

contacting a hydrocarbon feedstream with said oxidized stream comprising water and forming a reforming feedstream; and passing said reforming feedstream into a steam reforming reaction zone at steam reforming reaction conditions and producing a synthesis gas product, wherein a substantial portion of the steam reforming heat of reaction is provided by said oxidizing step.

18. The process of claim 17 wherein said hydrogen-containing stream comprises at least 80 mole percent hydrogen;

said hydrocarbon feedstream comprises water and less than 2 mole percent molecular oxygen; and said stream comprising oxygen comprises at least 90 mole percent oxygen and substantially all of said oxygen from said oxygen-containing stream is reacted so as to form said oxidized stream comprising water.

19. The process of claim 17 wherein said steam reforming reaction zone comprises a reforming catalyst further comprising at least one active metal selected from the group consisting of nickel, rhodium, copper, and cobalt;

said steam reforming reaction conditions comprise a reaction zone inlet temperature of at least 2400° F. and a reaction zone outlet temperature ranging from about 1600° F. to about 2200° F.; and said synthesis gas product exiting said steam reforming reaction zone has a hydrogen to carbon monoxide molar ratio of from about 2.5:1 to about 5:1.

20. The process of claim 17 wherein:

at least a portion of said synthesis gas product exiting said steam reforming reaction zone is directed to a hydrogen separation step for separating said synthesis gas into a stream comprising hydrogen and a second synthesis gas product;

at least a portion of said stream comprising hydrogen is added to said hydrogen-containing stream; and said second synthesis gas product has a hydrogen to carbon monoxide molar ratio of from about 1.5:1 to about 2.5:1.

* * * * *